United States Patent [19]

Kantz

[11] 4,268,555
[45] May 19, 1981

[54] WIDE-FOLDING HINGE

[75] Inventor: John F. Kantz, Oxford, N.J.

[73] Assignee: Union Carbide Corporation, New York, N.Y.

[21] Appl. No.: 107,085

[22] Filed: Dec. 26, 1979

[51] Int. Cl.³ .......................... B65D 5/36; S11F 1/08
[52] U.S. Cl. .............................. 428/35; 229/DIG. 4; 229/41 R; 156/207
[58] Field of Search ............... 229/DIG. 4; 428/184, 428/172, 35, 124; 156/207, 291

[56] References Cited

U.S. PATENT DOCUMENTS

| | | | |
|---|---|---|---|
| 1,482,569 | 2/1924 | Lange | 229/DIG. 4 |
| 1,565,765 | 12/1925 | Walter | 229/DIG. 4 |
| 1,758,230 | 5/1930 | Lange | 229/DIG. 4 |
| 1,973,930 | 9/1934 | Rammer | 229/DIG. 4 |
| 2,095,304 | 10/1937 | Zinser | 428/184 X |
| 2,276,363 | 3/1942 | Zalkind | 428/184 X |
| 2,558,918 | 7/1951 | Zinn, Jr. | 229/DIG. 4 |
| 2,770,406 | 11/1956 | Lane | 229/DIG. 4 |
| 3,122,300 | 2/1964 | La Bombard | 229/DIG. 4 |
| 3,659,772 | 5/1972 | Dorsey et al. | 229/DIG. 4 X |
| 3,746,593 | 7/1973 | Majewski et al. | 229/DIG. 4 X |

*Primary Examiner*—Davis T. Moorhead
*Attorney, Agent, or Firm*—Clement J. Vicari

[57] ABSTRACT

A wide-folding, linearly-hinged assembly of sheet members secured to each other in areas other than in the vicinity of the hinge is disclosed comprising: an inner sheet member having at least one ply and a female linear score on the inner side thereof; and an outer sheet member having at least one ply and at least four linear female scores arranged in pairs on opposed sides of said member, each of said outer scores bridging its paired inner score and said opposed pairs bridging said score of said inner sheet member.

5 Claims, 5 Drawing Figures

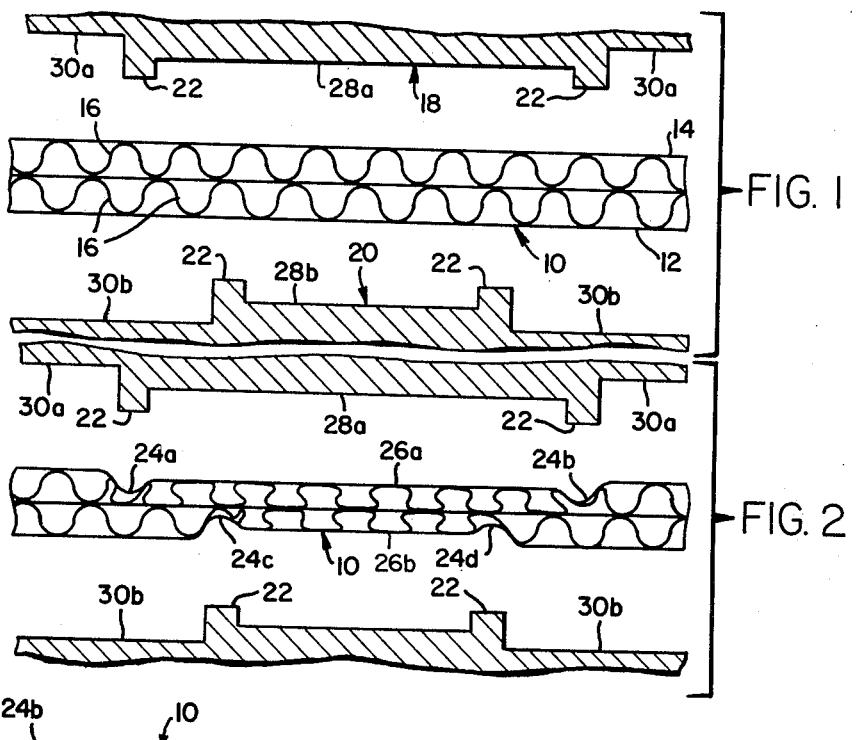
FIG. 1
FIG. 2
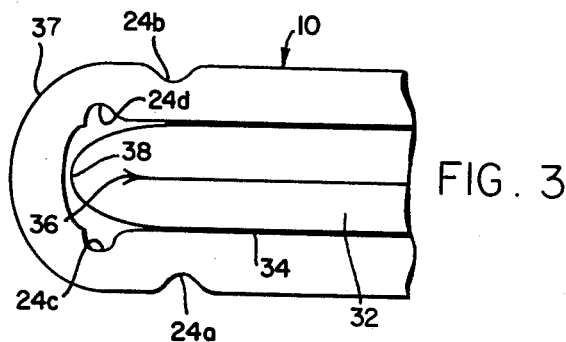
FIG. 3
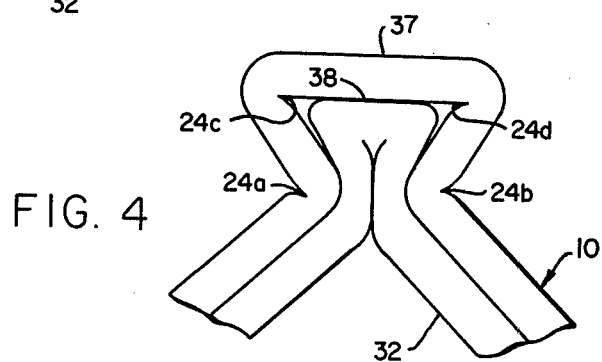
FIG. 4

WIDE-FOLDING HINGE

The present invention relates to a novel wide-folding, linearly-hinged assembly of sheet members particularly useful for employment with structural articles such as boxes, containers and the like.

Corrugated structural board or stock such as for boxes, containers and the like have normally been fabricated at one location and shipped in lay-flat position to the point of use of the article where they are assembled in the open position for use. These articles include linearly-hinged assemblies of sheet members.

Conventional scoring techniques used in such fabrication involve a single-profile (male) scoring head and a female anvil or surface. The corrugated board or stock transverses between the scoring head and anvil which are each mounted on a rotary axis. This conventional scoring method results in difficulty with alignment when the board is laminated to other boards, is difficult to fold over on itself and contributes to the fracturing of the outer boards when folded in a lay-flat position for storage and shipping.

It is the prime object of the present invention to provide linearly-hinged articles of scored board or stock members which will eliminate the previously-mentioned problems encountered with articles produced by conventional methods.

In accordance with the present invention, wide-folding, linearly-hinged assembly of sheet members secured to each other in areas other than in the vicinity of the hinge is provided comprising: an inner sheet member having at least one ply and a single female linear score on the inner side thereof; and an outer sheet member having at least one ply and at least four linear female scores arranged in pairs on opposed sides of said member, each of said outer scores bridging its paired inner score and said opposed pairs bridging said score of said inner sheet member.

The sheet stock (or board) members are each composed of sheets of heavy corrugated material. The corrugated material may be selected from a wide variety of commercially available corrugated materials having spaced, parallel liner boards of heavy paper, plastic material (such as polyethylene), light sheet metal or the like enclosing an internal corrugated medium positioned in an array, such as sinusoidal, and formed of paper, plastic material, sheet metal or composites or combinations of such paper and plastic materials and the like. The internal medium array is bonded (by gluing, thermal fusion or the like) to the interior walls of the liner boards in the manner normally employed for the formation of corrugated board material.

The sheet members may be, as desired, formed of single or multiple sheets of such corrugated material. It has been found preferable to form the sheet stock of at least double-ply material, but single ply material has been found sufficient for use.

Each of the sheet members are formed by die cutting or the like to the shapes desired.

The wide-folding, linearly-hinged assembly embodies a special type of scoring differing from normal scored profiles. Such folding scores would be normally fabricated by the fabricators of the corrugated board or stock. The folding scores at opposite ends of the lay-flat cut and joined article embodying the assembly have a double male profile creating reversed scores on the opposite faces formed by semi-continuous passage of corrugated board material through a pair of roller dies having male projections on each roll. The resultant corrugated product provides a generally "U"-shaped profile at opposite ends on edges of the lay-flat product. Such score-forming edges provide the obtainment of a corner clearance enabling the article to attain a lay-flat position in spite of the inclusion of other body member structure between the outer board, stock or sheet.

In the following description of the embodiment of the invention reference is made to the appended drawings wherein:

FIG. 1 is a partial vertical sectional view through the scoring heads and corrugated board material prior to scoring;

FIG. 2 is a particl vertical sectional view through the scoring heads and corrugated board material after scoring.

FIG. 3 is a partial edge or profile view of the wide-folding, linearly-hinged sheet assembly embodying the invention with the assembly in the lay-flat position;

FIG. 4 is a partial edge or profile view of the wide-folding, linearly-hinged sheet assembly embodying the invention with the assembly in the open position;

Figure 5:
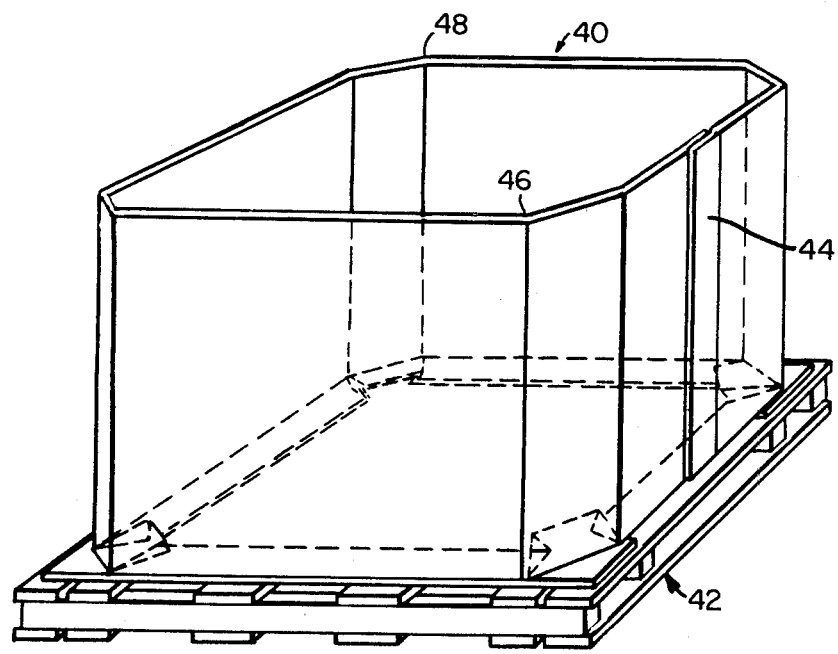
FIG. 5 is a perspective view of a container assembly of corrugated paper box and pallet employing a box such as wood utilizing the wide-folding, linearly-hinged sheet assembly of the invention.

As employed herein, the terms "board", "stock" and "sheet" each denotes either a single-ply layer of corrugated material or a plurality of such layers bonded together by the use of any one of a number of processes known to the art, some of which are referred to hereinabove.

Referring specifically to the embodiment of the figures of the drawings, an outer sheet member 10 provided as shown in the embodiment of FIG. 1 as a bonded double-ply 12, 14 set of sheets of material having internal corrugations 16, is passed between a pair of opposed scoring heads 18, 20. Each of the scoring heads has a pair of linear male scoring elements 22. As shown in FIG. 1 of the drawings with the scoring heads in the open position, the elements are positioned to produce female linear scores in the sheet member 10, the four linear female scores arranged in pairs on opposite sides of the member 10 with each of the outer scores bridging its paired inner score.

When the scoring press is closed, and subsequently reopened, as shown in FIG. 2 of the drawings, the sheet member 10 has been scored as shown in locations 24a, 24b, 24c and 24d. In addition, it has been found preferable to indent or compact the region 26a and 26b between linear scores on both sizes of sheet member in order to provide the resiliency in the sheet member in these locations which will assist in the later use of the sheet member as part of an assembly. This indenting or compacting action is brought about by the provision of a narrow spacing between the planes 28a and 28b of the scoring heads between the scores (between the scoring elements 30a and 30b) as against the planes 30a and 30b beyond the scoring elements 22 and of the scoring head.

After linearly scoring the outer sheet member 10 of the wide-folding, linearly-hinged assembly, the resultant scored sheet member is joined to an inner linearly-scored sheet member 32 which is produced by a conventional scoring method of the art. As shown in FIG. 3 of the drawings, a bonding is effected between the outer surface of hinged inner member 32 and the inner surfaces of folded outer member 10. Such bonding, as by gluing or the like in the case of corrugated paper and thermal or other joining in the case of thermoplastic material or metal, should not be made in the region of the hinge assembly of the invention. Such a joining should be effected no closer than region 34 as indicated in FIG. 3.

The wide-folding, linearly-hinged assembly of sheet members of the invention is shown in typical profile in the lay-flat position in FIG. 3 and in the open position in FIG. 4. As there shown, the linear scores such as 24a and 24b which form the outer surface of the outer sheet member expand as the hinge is closed while the inner scores 24c and 24d contract upon closing of the hinge. The single score 36 of the inner sheet member 32 is substantially closed in the folded hinge of the lay-flat position shown in FIG. 3. As shown in FIG. 4, with the hinge in the open position, the outer surface scores 24a and 24b are substantially closed while the inner scores 24c and 24d are more open than in the FIG. 3 showing. It should be noted that the centers of the hinge sheets at 37 and 38 are substantially "U"-shaped when the assembly is in the lay-flat position and are substantially flat when the assembly is in the open position.

It has been found that the wide-folding, linearly-hinged assembly of corrugated sheet members is particularly useful in the formation of bulk material boxes such as is employed in the storing and shipping of bulk solid material such as thermoplastic resins. One such embodiment of boxes is shown (without top) in FIG. 5 of the drawing wherein such a box 40 employing the hinge assembly of the present invention is formed into a container assembly of heavy corrugated paper board supported by a wooden pallet 42.

In such box 40 of octagonal shape, the corrugated board was fabricated with the overlapping junction or seam 44 and linear scoring which form the eight corners of the box 40. One set of opposite corners 46, 48 was formed with the wide-folding, linearly-hinged assembly of the present invention. These corners form the opposite ends of the box in the lay-flat position for shipping and storage.

A commercial size storing and shipping box for solid bulk material embodying the present invention has been fabricated and tested. The box had a capacity of 1500 pounds of bulk granular solid polyethylene resin material and was of the type generally shown in FIG. 5 of the drawings. The box body was formed of a scored heavy corrugated paper board inner ply material and such an outer material secured thereto. The inner board had eight linear scores for forming the corners of the box and a downwardly-depending extension with additional diagonal scores for infolding and supporting the base of the box. The over-all open dimension of the inner board (without the eight-inch downwardly-depending skirt extension) and the identical dimension of the outer layer of material was approximately 163 inches by 38 inches. The outer ply was scored on both its inner and outer surfaces in the two positions which would form the lay-flat box in the manner shown in FIG. 2 of the drawings. Thus, the outer ply had 14 linear scores, compared to the eight linear scores of the inner ply to which it was secured. The joined box in the lay-flat position was found to be storable and transportable in a minimum of space and the assembled box was found to exhibit great strength to compression in the unfilled as well as the filled condition. Such storing and shipping box is disclosed and claimed in copending patent application Ser. No. 098,066, entitled "Bulk Material Box", filed on Nov. 28, 1979 by Fu-Tong Hsu and John F. Kantz (export license file No. P-55378).

What is claimed is:

1. A wide-folding, linearly-hinged assembly of sheet members secured to each other in areas other than in the vicinity of the hinge comprising: an inner sheet member having at least one ply and a female linear score on the inner side thereof; and an outer sheet member having at least one ply and at least four linear female scores arranged in pairs on opposed sides of said member, each of said outer scores bridging its paired inner score and said opposed pairs bridging said score of said inner sheet member.

2. An article of manufacture having at least two wide-folding, linearly-hinged assemblies in accordance with claim 1.

3. An article of manufacture in accordance with claim 2, wherein said assemblies are positioned at opposite ends of said article when said article is in the lay-flat position.

4. An article of manufacture in accordance with claim 2 in which said sheet members are constructed of corrugated paper board.

5. An article of manufacture in accordance with claim 2, wherein said article comprises a portion of a box or container.

* * * * *